(12) United States Patent
Barton

(10) Patent No.: US 7,227,096 B2
(45) Date of Patent: Jun. 5, 2007

(54) STUD WELD

(75) Inventor: David D. Barton, Houston, TX (US)

(73) Assignee: Southern Stud Weld, Inc., Houston, TX (US)

(*) Notice: Subject to any disclaimer, the term of this patent is extended or adjusted under 35 U.S.C. 154(b) by 0 days.

(21) Appl. No.: 11/095,445

(22) Filed: Mar. 31, 2005

(65) Prior Publication Data

US 2006/0219669 A1 Oct. 5, 2006

(51) Int. Cl.
*B23K 9/00* (2006.01)
*B23K 11/04* (2006.01)

(52) U.S. Cl. .......................................... 219/98; 219/99

(58) Field of Classification Search ............... 219/98, 219/99
See application file for complete search history.

(56) References Cited

U.S. PATENT DOCUMENTS

| 3,997,754 | A | * | 12/1976 | Moliner et al. | ............... 219/99 |
| 4,085,307 | A | * | 4/1978 | Jenkins | ......................... 219/98 |
| 4,160,148 | A | * | 7/1979 | Jenkins | ......................... 219/98 |
| 5,565,116 | A | * | 10/1996 | Barton et al. | ................. 219/98 |
| 5,618,491 | A | * | 4/1997 | Kurup et al. | ................. 420/77 |

* cited by examiner

*Primary Examiner*—Jonathan Johnson
*Assistant Examiner*—Rachel E. Beveridge
(74) *Attorney, Agent, or Firm*—Bracewell & Giulini LLP

(57) ABSTRACT

A welding stud is attachable to a workpiece at a work end portion shaped for enhanced attachment strength with the workpiece. The welding stud has a portion of reduced thickness along a body portion between the work end portion and a retaining collar. The reduced thickness portion is furnished to yield or bend in the event of contact by some other body or piece and preserve the integrity of the attachment weld. The work end portion may also have an enlarged contact face with increased surface area for forming the weld.

14 Claims, 1 Drawing Sheet

STUD WELD

BACKGROUND OF THE INVENTION

1. Field of the Invention

The present invention relates to stud welding. More specifically, the present invention provides an improved welding stud for a stud welding gun.

2. Description of the Related Art

It has been common practice to attach labels or other information bearing tags to steel bars or other metallic product bundles or objects for identification purposes before their being subjected to further types of processing, such as galvanizing or other treatment, or for shipment. Problems arose if the label was broken away from the object or bundle before or during processing or treatment. One form of label attachment was based on the use of welding studs for that purpose. U.S. Pat. No. 5,565,116, of which Applicant is a named inventor, related to one form of such a welding stud.

With studs of these types, the ability of the stud to remain affixed with the labeled object as a result of contact with another body or component during shipping or handling was a function of the strength of the attachment weld. There were situations where the attachment weld could be weak due to one or more of several factors. For example, when a high-carbon steel content object to receive the stud was at an ambient or unheated temperature at the time the stud was welded, in contrast to a heated state, the resultant weld might not be as strong as it could have been. Further, high alloy steel or high carbon cold application of the stud after fabrication might result in weld zones that have poor or less than normal weld strengths. If the contact force transmitted through the body of the stud when bent was greater than the strength of the attachment weld, the stud became dislodged or broke away from the labeled object. Dislodgment or breakage of the stud was undesirable and contrary to the purpose for which the stud was intended to be used.

SUMMARY OF THE INVENTION

Briefly, the present invention provides a new and improved welding stud for a capacitor stud welding gun system to attach a component to a workpiece. The welding stud according to the present invention includes a connector head at one end of the stud for fitting into the welding gun of the system, with a collar formed along an intermediate portion of the stud for retaining the component on the workpiece when the stud is attached. The welding stud of the present invention also includes a work end for welding attachment to the workpiece. An intermediate body portion of the welding stud is formed extending between the work end and the collar. The intermediate body portion has a reduced thickness shaft section along a portion of its extent between the work end and the collar, with the reduced thickness shaft section having lower yield strength. The structure of the intermediate body portion of the welding stud allows the stud to yield when struck, impacted, bent or otherwise subjected to forceful contact and to preserve the weld attachment of the stud to the workpiece.

The welding stud of the present invention also includes an end flat or surface formed on the work end and having an enlarged contact face with increased surface area for forming the weld. A shoulder surface is formed rearwardly of the flat surface and tapering inwardly to the body portion.

BRIEF DESCRIPTION OF THE DRAWINGS

A better understanding of the present invention can be obtained when the detailed description set forth below is reviewed in conjunction with the accompanying drawings, in which.

DETAILED DESCRIPTION OF THE PREFERRED EMBODIMENTS

Figure 1:
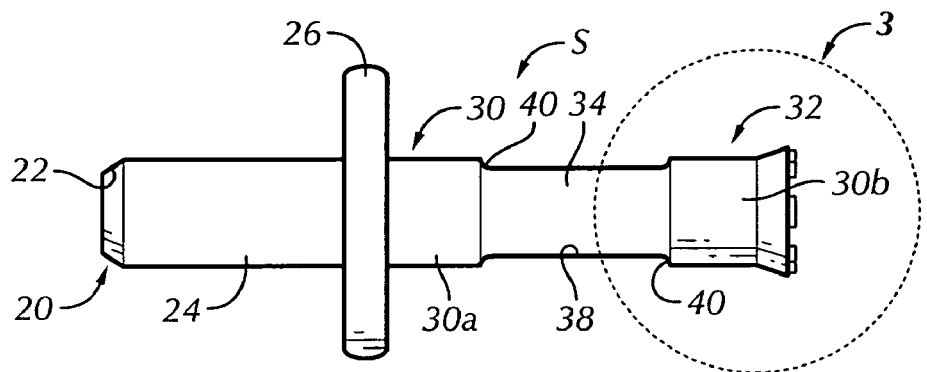
FIG. 1 is a side elevation view of a welding stud according to the present invention.
Figure 2:
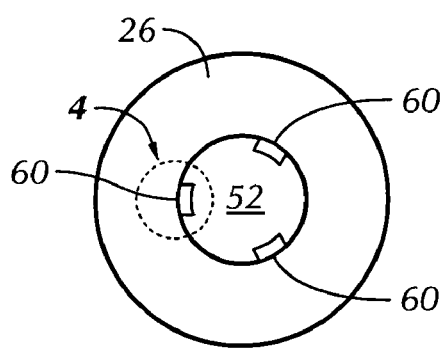
FIG. 2 is an end view of the welding stud of FIG. 1.

In the drawings, the letter S designates generally a welding stud according to the present invention. The welding stud S may be used with several types of stud welding guns. For example, the welding stud S may be used in conjunction with a capacitor discharge welding system. An example of a suitable capacitor discharge welding system is that of U.S. Pat. No. 5,565,116, of which Applicant is a co-inventor. It should be understood, however, that welding studs according to the present invention may also be used with other capacitor discharge welding systems, as well. It should also be understood that the stud S may also be used with stud welding guns of others types, such as drawn arc stud welding guns and short cycle systems.

In the preferred embodiment, the welding stud S is generally rounded or cylindrical in shape and has a generally round cross-section. The stud S of the present invention may be formed of a variety of conventional welding stud materials, and may be, for example, an annealed stainless steel. The dimensions of the stud S also may vary based on intended end use. In one embodiment, the stud S is one inch or so in length.

The stud S is adapted to be fitted at a connector head or gun end 20 into a stud welding gun of stud welding system. A chamfered edge 22 is formed about the edge of the connector head 20 for ease of connection of the stud S into the stud welding gun. The stud S extends from the connector head 20 along an upper body portion 24 to a laterally extending collar or ring 26. The collar 26 is located typically from about one-third to about one-half of the longitudinal extent of the stud S from the connector head 20. The collar 26 is adapted to function as a stop or stay when the stud S is inserted into the stud welding gun, with the upper body portion 24 above the collar 26 fitting into the stud welding gun.

The collar 26 also retains a component to be attached, such as a label or tag, in place on the stud S once stud welding is completed. It should be understood that a label or tag is only an example component which is attachable by the stud S. The stud S is welded to a work piece so that a component, such as identification tag, label or other identifying device, may be associated with the workpiece. Other types of components such as attachment structure for insulation and fireproof materials for furnaces and high temperature equipment may also be attached to the studs. The type of steel used in the stud would vary according to the particular application. The workpiece may be some form of steel product such as steel bars, beams, rods or the like, or it may be some other item or object which must remain identifiable during further processing or treatment, such as galvanizing or the like. Usually, the diameter of the collar 26 is forty or fifty percent of the length of the stud S, and can vary according to the tag with which it is used, typically based on the size of the hole formed in the tag to receive the stud.

The stud S extends from the upper body portion 24 and collar 26 through an intermediate portion 30 to a work or lower end 32 opposite the connector head or gun end 20. The intermediate body portion 30 extending between the collar 24 and the work end 32 is typically about one-half to two-thirds of the longitudinal extent of the welding stud S. A reduced thickness shaft section 34 is formed in the intermediate body portion 30. The reduced thickness shaft section 34 is provided to have a lower yield strength that the remainder of the intermediate body portion 30. The reduced thickness shaft section 34 may be round, cylindrical, elliptical or any suitable cross-sectional shape, so long as it exhibits the ability to yield prior to yielding of the weld zone when the attached stud S is struck or bent. Any of several suitable machining or forming methods may be used to form the reduced thickness shaft section 34, based on the cross-sectional shape chosen.

The reduced thickness shaft section allows the stud S to yield in that region when struck, impacted, bent or otherwise forcefully brought into contact with some object or obstacle during handling, loading, unloading, shipping or other movement or transport, or from unwanted contact during storage. The lower yield strength of the reduced thickness shaft section 34 is provided by the reduced thickness of the shaft section 34 in contrast with body portion 32, and also by other treatment and design factors, if desired, as will be set forth.

Figure 3:
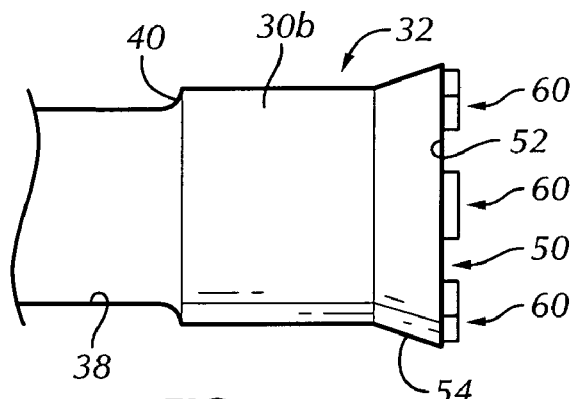
FIG. 3 is an enlarged view of a portion of the welding stud of FIG. 1 circled and having reference numeral 3 designating same.

The reduced thickness shaft section 34 may extend from about thirty percent to about one-half of the longitudinal extent of the intermediate body portion 30 between the collar 24 and the work end 32. It should be understood that the shaft section 34 may be shorter, if desired. In such a case, the shaft section 34 would be correspondingly reduced in cross-section to provide weld protection. Usually the reduced thickness shaft section 34 has an outer diameter which is about eighty percent or so of the outer diameter of the intermediate body portion 30 to reduce the yield strength of the stud S in the region of the reduced thickness shaft section 34. The yield strength of the reduced thickness shaft section 34 may also be reduced by subjecting an outer surface 38 of that portion of the stud S to a rolling treatment and not subjecting the remainder of the stud S to such a treatment. The outer surface 38 of the reduced thickness shaft section 34 may take a variety of forms other than that of the smooth outer surface 38 show in FIG. 1 and 3.

An curved or tapered transition zone 40 is formed at each end of the reduced thickness shaft section 34 at its juncture with adjacent portions 30a and 30b of the intermediate body portion 30 to prevent cracking or breaking of the stud S at such junctures in the event of yielding or bending of the stud S.

The work end 32 of the stud S has an end flat surface 50 formed thereon. The end flat surface 50 has an enlarged contact face 52 larger in surface area than the cross-sectional area of the intermediate body portion 30 at the work end 32. The outer diameter of the enlarged contact face 52 is twenty to thirty percent greater than the outer diameter of the intermediate body portion 30 at the work end 32. The enlarged contact face 52 provides an increased surface area for forming of the weld during weld operations. The enlarged contact face 52 may be formed, for example, by a swaging action on the work end 32, as will be described below.

A shoulder surface 54 is formed on the work end 32 rearwardly of the enlarged contact face 52. The shoulder surface 54 tapers inwardly from the enlarged contact face 52 to the intermediate body portion 32, and is also formed as a result of the swaging action.

A plurality of arc initiation tips 60 are formed extending outwardly from the enlarged contact face 52 as shown, in the direction of the workpiece. The arc initiation tips 60 serve as pilot arc initiators and vaporize during the initial surge of welding current and thus during such pilot arc initiation or formation cause initial arcing to assist in the beginning of weld formation. The tips 60 may be formed on the work end 32 of the stud S using any one of several commercially available header machines.

During forming of the tips 60, the work end 32 is formed into an initially cup-shaped configuration, with a central recess bounded by an outer cylindrical wall. The work end 32 in this cup-shaped configuration is subjected to an impact by a tool having circumferentially arranged spaces corresponding to the number of tips 60 to be formed on the work end 32. The impact causes portions of the cup-shaped work end to be driven downwardly, leaving the unimpacted areas in the form of up-right facing tips 60 as shown in the drawings.

The same impact causes the bed of the cup-shaped work end 32 to be expanded radially outwardly to form the enlarged contact face 52. The same impact also at the same time exerts a swaging action on the work end 32 and causes the shoulder surface 54 tapering inwardly from the enlarged contact face 52 to the intermediate body portion 30. The arc initiation tips 60 extend in a preferred embodiment some twenty to forty mils outwardly at the workend 32 from the contact face 52, although the extent may be larger or smaller, as work needs require.

Figure 4:
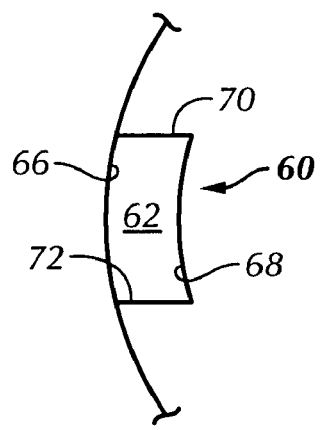
FIG. 4 is an enlarged view of a welding stud of FIG. 2 circled and having reference numeral 4 designating same.
Figure 5:
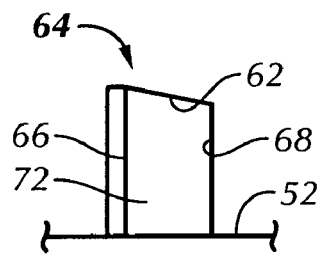
FIG. 5 is a side elevation view of the structure of FIG. 4.

The arc initiation tips 60 are in the form of upraised arcuate segments (FIG. 4) located slightly inwardly (FIG. 3) from an outer or side edge portion 64 of the enlarged contact face 52 as a result of the swaging action discussed above. The tips 60 are preferably equally spaced from each other about a circumferential path around the enlarged contact face 52. Typically, the arc initiation tips 60 have a tapered upper surface 62 on an inner end or head 64 to form a reduced area for facilitating initiation of the pilot arc. The tips 60 have arcuate outer walls 66 and arcuate inner walls 68 extending between side walls 70 and 72.

The tips 60 of the welding stud S according to the present invention performs several functions. First, the tips 60 provide initial contact or pressure points for the stud S on the workpiece P. Depending on the particular stud welding operations, the stud S may be selected according to the most suitable type of end surface needed. Further, the tips 60 are equally spaced circumferentially from the center of the enlarged contact face 52. Usually, there are at least three such equally circumferentially spaced tips 60. The tips 60 each extend outwardly from the enlarged contact face 52 equidistantly with respect to each other. This allows the tips 60 to come into contact with the surface of the workpiece where the weld is to take place.

In prior art welding studs where a single, centrally located contact point was present, the single tip might encounter and fit into a surface irregularity, such as a crack or gap in the workpiece surface. In such an event, a shortened pilot arc length would be present which could shorten welding time and duration. This in turn could give rise to an inconsistent weld, with reduced likelihood of forming a good weld bond between the stud and the workpiece.

The tips 60 also provide a longer standardized pilot arc over which an arc can be formed than the prior conventional tip or point. This permits longer weld time and better arc formation and weld penetration, particularly on rough or irregular workpiece surfaces, or on hardened or high carbon workpiece surfaces. Further, the tips 60 afford a relatively high resistivity path for the welding current which causes vaporization of the material of the arc initiation tips, and thus initiating a constant pilot arc. This more rapidly produces a melting point in the stud S at the workpiece.

The central area 70 of the contact face 52 with the circumferentially disposed tips 60 also defines an extended, larger arc surface area within the tips 60 for better heat distribution and melting distribution of welding current to the workpiece. The stud S and the central area 70 rearwardly of the tips 60 also form a pocket for accumulation of molten flux on the workpiece P, providing adequate molten stud material for a strong and reliable weld.

It should be noted and understood that there can be improvements and modifications made of the present invention described in detail above without departing from the spirit or scope of the invention as set forth in the accompanying claims.

What is claimed is:

1. A welding stud for a stud welding gun to attach a component to a workpiece, comprising:
    a connector head at one end of the stud for fitting into the welding gun;
    a collar formed along an intermediate portion of the stud for retaining the component on the workpiece when the stud is attached;
    a work end for welding attachment to the workpiece at a weld zone formed therebetween;
    an intermediate body portion extending between the work end and the collar, the intermediate body portion having a reduced thickness shaft section formed along a portion of from about thirty to about fifty percent of its extent between the work end and the collar;
    the reduced thickness shaft section having lower yield strength than the remainder of the intermediate body portion; and
    the reduced thickness shaft section yielding prior to yielding of the weld zone when the stud is contacted to preserve the weld of the stud to the workpiece.

2. The welding stud of claim 1, wherein the stud welding gun is a capacitor discharge stud welding gun.

3. The welding stud of claim 1, wherein the stud welding gun is a drawn arc stud welding gun.

4. The welding stud of claim 1, wherein the intermediate body portion is cylindrical in cross-section, and wherein the reduced thickness shaft section is cylindrical.

5. The welding stud of claim 1, wherein the welding stud is formed of steel and wherein the external surface of the reduced thickness shaft section is formed.

6. The welding stud of claim 1, wherein the welding stud is formed of steel and wherein the external surface of the reduced thickness shaft section is rolled.

7. The welding stud of claim 6, wherein the intermediate body portion of the welding stud is annealed.

8. The welding stud of claim 1, further included a rounded transition zone formed on the welding stud between the intermediate body portion and the reduced thickness shaft section.

9. The welding stud of claim 1, further including:
    an end flat surface formed on the work end and having an enlarged contact face with increased surface area for forming the weld; and
    a shoulder surface formed rearwardly of the enlarged contact face of the end flat surface and tapering inwardly to the intermediate body portion.

10. A welding stud for a stud welding gun to attach a component to a workpiece, comprising:
    a connector head at one end of the stud for fitting into the welding gun;
    a collar formed along an intermediate portion of the stud for retaining the component on the workpiece when the stud is attached;
    a work end for welding attachment to the workpiece at a weld zone formed therebetween;
    an intermediate body portion extending between the work end and the collar, the intermediate body portion having a reduced thickness shaft section of from about ten to twenty percent less in thickness than the thickness of the intermediate body portion;
    the reduced thickness shaft section having lower yield strength than the remainder of the intermediate body portion; and
    the reduced thickness shaft section yielding prior to yielding of the weld zone when the stud is contacted to preserve the weld of the stud to the workpiece.

11. A welding stud for a stud welding gun to attach a component to a workpiece comprising:
    a connector head at one end of the stud for fitting into the welding gun;
    a collar formed along an intermediate portion of the stud for retaining the component on the workpiece when the stud is attached;
    a work end for welding attachment to the workpiece;
    a body portion extending between the work end and the collar;
    an end flat surface formed on the work end and having an enlarged contact face with increased surface area for forming the weld;
    a plurality of arc initiation tips formed on the end flat surface to form arcing points to facilitate initial flow of arcing current between the stud and the workpiece;
    the arc initiation tips being located inwardly form a side edge of the end flat surface; and
    a shoulder surface formed rearwardly of the enlarged contact face of the end flat surface and tapering inwardly to the body portion.

12. The welding stud of claim 11, further including;
    the plurality of arc initiation tips formed extending outwardly equidistantly from the end flat surface to form a uniform spacing between the end flat surface and the workpiece.

13. The welding stud of claim 11, wherein the arc initiation tips have inwardly sloping end surfaces formed thereon.

14. The welding stud of claim 11, wherein the arc initiation tips extend in arcuate segments on the surface of the end flat surface.

* * * * *